May 12, 1970  A. J. GAWIN ET AL  3,511,564
READER-PRINTER WITH PLASTIC TRANSPORT BELT
Filed May 18, 1967  5 Sheets-Sheet 1

Fig. 1.

Inventors:
Adolph J. Gawin,
Robert F. Porazinski,
Daryl J. Strahan.

By  Atty

United States Patent Office 3,511,564
Patented May 12, 1970

3,511,564
READER-PRINTER WITH PLASTIC
TRANSPORT BELT
Adolph J. Gawin, Skokie, Robert F. Porazinski, Norridge, and Daryl J. Strahan, Evanston, Ill., assignors to Bell & Howell Company, Chicago, Ill., a corporation of Illinois
Filed May 18, 1967, Ser. No. 639,369
Int. Cl. G03g 15/00
U.S. Cl. 355—3
16 Claims

ABSTRACT OF THE DISCLOSURE

A reader-printer cabinet is provided with a viewing screen and a front wall and print-out means in the top of the cabinet. A transport belt made of an electrically insulating polyester film material has a lower run formed by a leg disposed in a substantially horizontal plane across the top of the cabinet interior, thereby to form an exposure station. Means forming an optical track in the cabinet selectively projects an image onto the viewing screen or onto a focal plane coincident with the belt at the exposure station. Charging means establishes an electrostatic field through which a carrier sheet and the belt may be passed, thereby to electrostatically assemble the carrier sheet and the belt so that no other holding means is required to position the carrier sheet at the exposure station. Further, the belt is provided with a plurality of openings corresponding to timing information. Circuit means responsive to the sensing of such openings control and actuate various means to selectively move the belt, expose the carrier sheet to projected images and develop the carrier sheet, all in accordance with a program coded into the belt.

BACKGROUND OF THE INVENTION

Field of the invention

The present invention relates generally to cabinet readers and more specifically to copying apparatus and methods.

Description of the prior art

Cabinet readers are well known in the art and cabinet readers with a print-out facility have also been provided heretofore. Such print-out means follow many of the copying techniques heretofore provided including diffusion transfer, spirit duplicating or electrostatography.

SUMMARY OF THE INVENTION

In accordance with the principles of the present invention, the reader-printer is characterized by a belt made of Mylar brand material, which is a tough polyester film of exceptionally strong characteristics capable of resisting chemicals and solvents, virtually unbreakable and an excellent insulator. As such, the belt made of such material is particularly capable of receiving and holding an electrostatic surface charge when passed through an appropriate charging field.

In accordance with the present invention, a pair of rollers are located in the top of a reader cabinet and the belt is trained over the rollers to extend from front to rear, thereby disposing a lower leg in a position to form an exposure station or zone.

A charging means adjacent one end of the leg near one of the rollers establishes an electrostatic charging field through which the belt together with a carrier sheet is directed for effecting an electrostatic assembly of the sheet with the belt, thereby permitting the sheet to be positioned in the exposure station without any other holding or restraining means. A storage station containing either a supply of cut sheets or a spool of carrier sheets is arranged superjacent the belt and is disposed to discharge a carrier sheet onto the upper run or upper leg of the belt just prior to the charging station.

The roller at the other end of the belt is preferably made of a small diameter so that the abrupt change in direction of the belt will assist in stripping the exposed carrier sheet from the belt and direct the same into a developing station located in the top of the cabinet adjacent one end of the belt.

Means forming an optical track are provided in the cabinet, thereby to selectively project an image onto a focal plane coincident with the exposure station and the leg of the belt, or onto a viewing screen in a front wall of the cabinet.

The belt is particularly characterized by having openings formed therein corresponding to timing information and defining sections of a print-out program. Contacts are provided for sensing the openings. Circuit means responsive to the sensing of the contacts are provided which include a motor drive means for selectively moving the belt. The circuit means may also include an illumination means to project the image and a developing means to develop the carrier sheet. Thus, the circuit means activates a program section corresponding to the program sensed and the carrier sheet will be automatically transported by the belt for successive charging, exposing and developing in a completely automatic manner once initiated by the operator.

DESCRIPTION OF THE PREFERRED EMBODIMENTS

Figure 1:
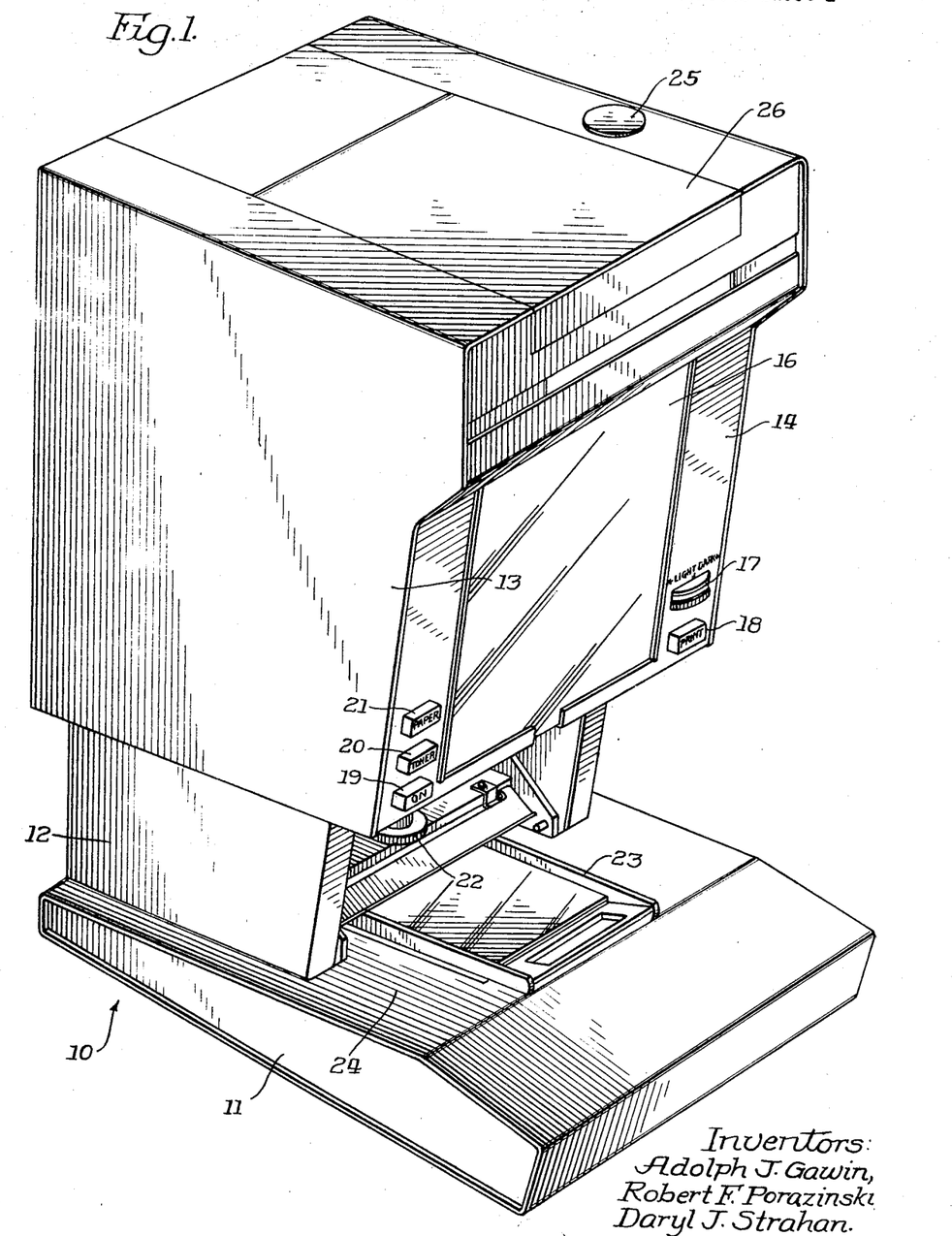
FIG. 1 is an isometric view of a reader-printer provided in accordance with the principles of the present invention.

Referring to the drawings, a reader-printer is shown generally at 10 and comprises an irregularly shaped cabinet having a lower platform section 11, an intermediate pedestal portion 12 and a casing section shown at 13. The casing 13 has a front wall 14 in which is mounted a viewing screen 16. Adjacent the viewing screen 16 are various controls and indicators situated in a panel-like array. An exposure illumination control for regulating the voltage on the lamp is shown at 17. An actuating button for initiating a print-out action is shown at 18. An on-off switch is located at 19 and two indicator lights are shown at 20 and 21 which are labeled "toner" and "paper," respectively, and which light up when the supply of toner or paper has been depleted.

A focus adjustment knob is shown at 22 and a fiche holder is shown generally at 23 movable over a flat platen surface 24 in order to selectively project any one of a plurality of microimages disposed on the fiche in horizontal rows and vertical columns onto the viewing screen 16.

The cabinet 13 is a generally light-tight enclosure and has a hinged access lid 26 for permitting the operator to gain access to the print-out means in the upper portion of the cabinet. A cap 25 provides access for replenishing the reservoir of liquid developer material.

Figure 2:
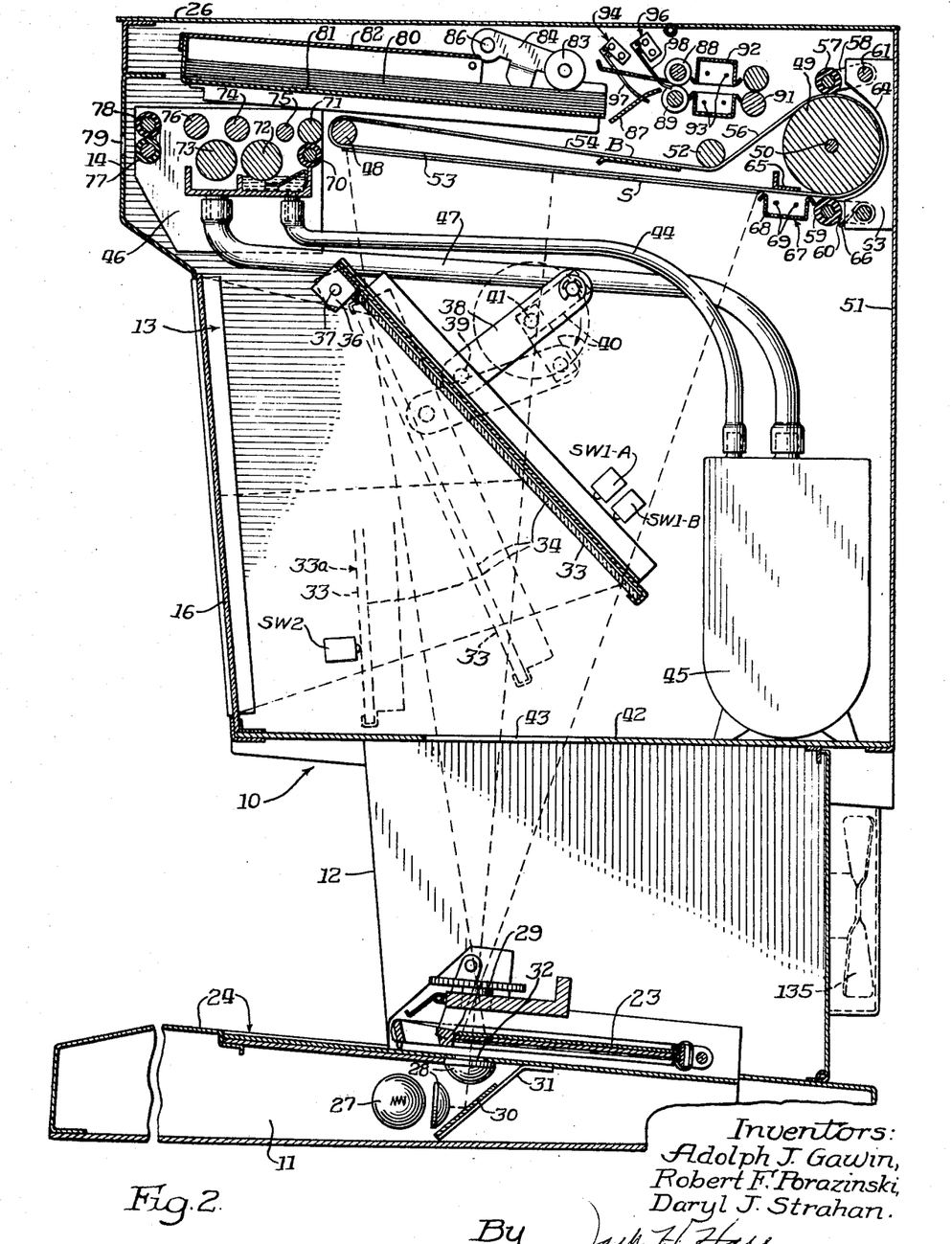
FIG. 2 is a cross-sectional view of the reader-printer shown in FIG. 1.

Referring now to FIG. 2, it will be noted that the fiche holder 23 is movably related in alignment with various components of an optical track formed in the interior of the cabinet 10 to selectively project an image on a fiche held in the fiche holder 23, either onto the viewing screen 16 or up into the print-out means in the top of the cabinet. More specifically, some of the components of the optical track include an illumination means taking the form of a light bulb 27 in optical register with lens means shown at 28 and between which is disposed a mirror 30 carried on a bracket 31 and disposed in a direction-changing position so that the rays of light from the light bulb 27 will be directed through the images on the fiche positioned in register with an opening 32 in the platen surface 24. The rays of light which pass through the fiche are then directed through lens means 29.

A large mirror is shown at 33 and is carried on a frame 34 pivotally mounted for swinging movement by a bracket 36 having a pivot axis established by a pin 37. The mirror frame 34 swings between a full line position, as shown in FIG. 2 and the dotted line position shown generally at 33a. In order to control the positioning of the mirror frame 34 automatically, a control linkage is provided including a link member 38 pivotally connected to the mirror frame as at 39 and operatively connected via a crank arm 40 to a driving shaft 41 of an appropriate motor.

Limit switches SW1-A, SW1-B and SW2 are positioned at the extremities of mirror movement for control purposes to be described later.

The cabinet section 13 has a lower wall shown at 42 in which is formed an opening 43 for transmission of the projected image. The wall 42 serves to provide a support surface for carrying a reservoir 45 and a recirculating pump construction contained therein so that a supply of liquid developer material may be discharged through a conduit 44 into a developer unit 46 mounted in an upper portion of the cabinet 13. A return conduit 47 carries spent developer liquid back from the developer unit 46 to the reservoir 43.

The developer unit 46 is located in the front portion of the cabinet immediately adjacent the front wall 14 and also adjacent one of a pair of rollers including a roller 48 and a roller 49 spaced apart from one another and situated in a relatively front position and rear position, respectively, in the upper part of the cabinet. The roller 48 is mounted for rotation closely adjacent the developer unit 46 and it will be noted that the roller 48 is relatively small in its diametral dimension.

The roller 49 is carried on a shaft 50 and is journaled for rotation near the rear portion of the cabinet 13 adjacent a rear wall 51. As distinguished from the roller 48, it will be noted that the roller 49 is of relatively large diameter. An idler roller 52 is provided at an intermediate point, thereby to provide a guide for an endless belt which is trained over the rollers 48 and 49 and under the idler roller 52 in order to provide a lower run or lower leg 53 which extends substantially horizontally across a substantial portion of the upper part of the cabinet 13. The upper leg has two sections including a first section 54 extending between the roller 48 and the idler roller 52. That section 54 is almost parallel to the lower leg 53. A second section extends in a general upward angularly inclined direction, as shown at 56, and extends from the idler roller 52 over the top of the roller 49.

A transport roller 57 is pivotally carried on a link arm 58 at the top of the roller 49. A second transport roller is shown at 59 and is also carried on a link arm 60. The link arms 58 and 60 are pivotally mounted by means of pins 61 and 62, respectively, carried by an appropriate frame support which also carries a direction-changing baffle 63 having a curved surface 64 generally complementary in shape to the adjoining peripheral surface of the roller 49.

The transport roller 57 rests on the surface of the belt gravitationally, thereby to form a nip with the belt. For convenience in identification, the belt will be indicated generally by the reference character B.

The lower roller 59 also forms a nip with the belt and to insure contact therewith, a torsion spring is provided at 66 to bias the link arm 60 generally upwardly around the axis of the pin 62.

The belt B can be made of any suitable insulating material, however, a particularly advantageous material is Mylar, it being understood that the term "Mylar" is a trademark designation for a commercially available polyester film having unusual strength characteristics and capable of resisting chemicals and solvents, as well as functioning as an excellent insulator. As an insulator, the belt B is particularly capable of receiving and retaining a surface charge when it is passed through a charging field.

It is contemplated by the present invention, therefore, that the insulative characteristics of the belt B be exploited in order to accomplish an electrostatic holddown of a carrier sheet. To that end, there is provided a corona charging unit shown generally at 67 and including a trough-shaped reflector 68 through which extends one or more corona charging electrodes 69 extending across and adjacent the width of the belt B in order to establish a corona charging field through which the belt B is directed.

The lower leg 53 of the belt B is disposed to form an exposure station or zone. Thus, the lower leg 53 is coincident with the focal plane of the optical track. In other words, whenever the mirror 33 is moved out of position, i.e., from the full line (read) position to the dotted line (print) position 33b, as shown in FIG. 2, the image projected by the optical track will be focused on the lower leg 53 of the belt B.

Accordingly, it is contemplated by the present invention that a carrier sheet may be deposited at least partly by gravity onto the upper leg of the belt B and preferably on the inclined portion 56, whereupon the carrier sheet will enter the nip formed between the belt B and the transport roller 57 and will be guided by the curved surface 64 around the large roller 49, past the insulating transport roller 59 and through the electrostatic charging field established by the corona charging unit 67 and a grounding electrode 65. As a result of such charging action, the carrier sheet, one of which is shown at S, will be electrostatically assembled or connected to the belt B so that it will be positioned in the exposure station without any additional restraining or holding means required. Accordingly, the belt may be stopped with the sheet S in position for a full frame exposure to the image projected by the optical track.

Thereafter, when the belt is again started, the abrupt change of direction accomplished by the relatively small diameter of the roller 48 will assist in peeling the sheet S off of the belt surface B and the sheet S will be directed into the nip of a pair of transport rollers 70 and 71 located at the inlet side of the developer unit 46. The sheet S then passes over a developer roller 72 for development of the exposed carrier sheet by the means of a developer liquid and is subsequently passed over a reversely rotating drying roller 73.

The carrier sheet S is guided into contact with the developer roller 72 by a stationary roll 75. Further details of the developer unit 46 may be had by reference to co-pending application SN 623,770, filed Mar. 16, 1967, although other known ways of developing electrostatic latent images may be used without departing from our invention.

In a preferred embodiment of the developer unit, however, to achieve greater uniformity of development and control of background development, a bias voltage may be applied to either roller 71 or, preferably, stationary roll 75. If a bias voltage is used the roller 71 or stationary roll 75, whichever is selected, will be made of conductive material, but insulated from the frame or other ground.

Additional spaced transport rollers are shown at 74 and 76 to assist in transporting the sheet through the developer unit 46 and the sheet is then passed through the nip of a pair of transport rollers 77 and 78 at the exit side of the developer unit for discharge through a discharge opening 79 in the front wall 14.

While various developing techniques can be employed, the illustrative embodiment herein shown by way of example contemplates the usage of cut carrier sheets, a supply of which can be provided as shown at 80 wherein a plurality of precut carrier sheets are located in a storage cassette 81 partially enclosed by a cover 82 and having the uppermost sheet engaged by feed rollers 83 carried on a lever 84 pivoted as at 86. The feed rollers feed one sheet at a time into an inlet guide 87 and through the respective nips of inlet and outlet transport rollers 88 and 89 on the inlet side, and 90 and 91 on the outlet side of a double corona charging unit shown generally at 92. The double corona charging unit 92 has two trough-shaped reflector elements each provided with corona electrodes 93, thereby to establish a potential on opposite sides of the sheet directed therethrough. In the embodiment described, a negative charge is applied to the upper or zinc oxide-coated side of the sheet S.

The voltage to the corona charging unit 67 is also negative so that a negative charge is applied to the zinc oxide coated side of the sheet S. It is found that in addition to electrostatically tacking the sheet S in position, this second charging step enhances the quality of the image by reinforcing the charge applied by the double corona charging unit 92.

To obtain the tacking effect in practice it has been found necessary to provide the grounding electrode 65, although the principles involved are not fully understood at the present time.

First and second switch means are shown at 94 and 96, respectively, and include feeler arms or fingers 97 and 98, thereby to sense the leading and trailing edges of the carrier sheets for control purposes as will be more fully explained hereinafter. In following an electrostratographic copying procedure, it will be understood that the carrier sheets are provided with a photoconductive surface such as zinc oxide or the like. Thus, a uniform charge is placed on the photoconductive surface as the carrier sheet passes through the double corona charging unit 92. The additional charge supplied by the corona charging unit 67 insures that the carrier sheet S will be tightly adhered to the belt B and the uniformly charged photoconductive surface will then be conditioned for exposure to the image at the exposure station, whereupon a latent electrostatic image will be provided in the photoconductive surface in the form of a charge pattern corresponding to the image. The developer unit 46 renders such latent image visible by applying visible opaque particles to the surface in accordance with the charge pattern established.

In accordance with the principles of the present invention, the belt B not only develops a transport function but also constitutes an apertured record medium and contains a control program for effecting an automatic print-out programmed operation. Thus, as shown in FIG. 3, the belt B has apertures along different areas thereof corresponding to coded information and means are provided for receiving and transmitting the information from the program to corresponding electrically actuated driving means.

More specifically, note that adjacent the respective edges of the belt B there are provided openings 100 adjacent one edge of the belt and 101 adjacent the opposite edge of the belt. Appropriate switch means are mounted in position with contacts sensing the perforations or openings.

Figure 3:
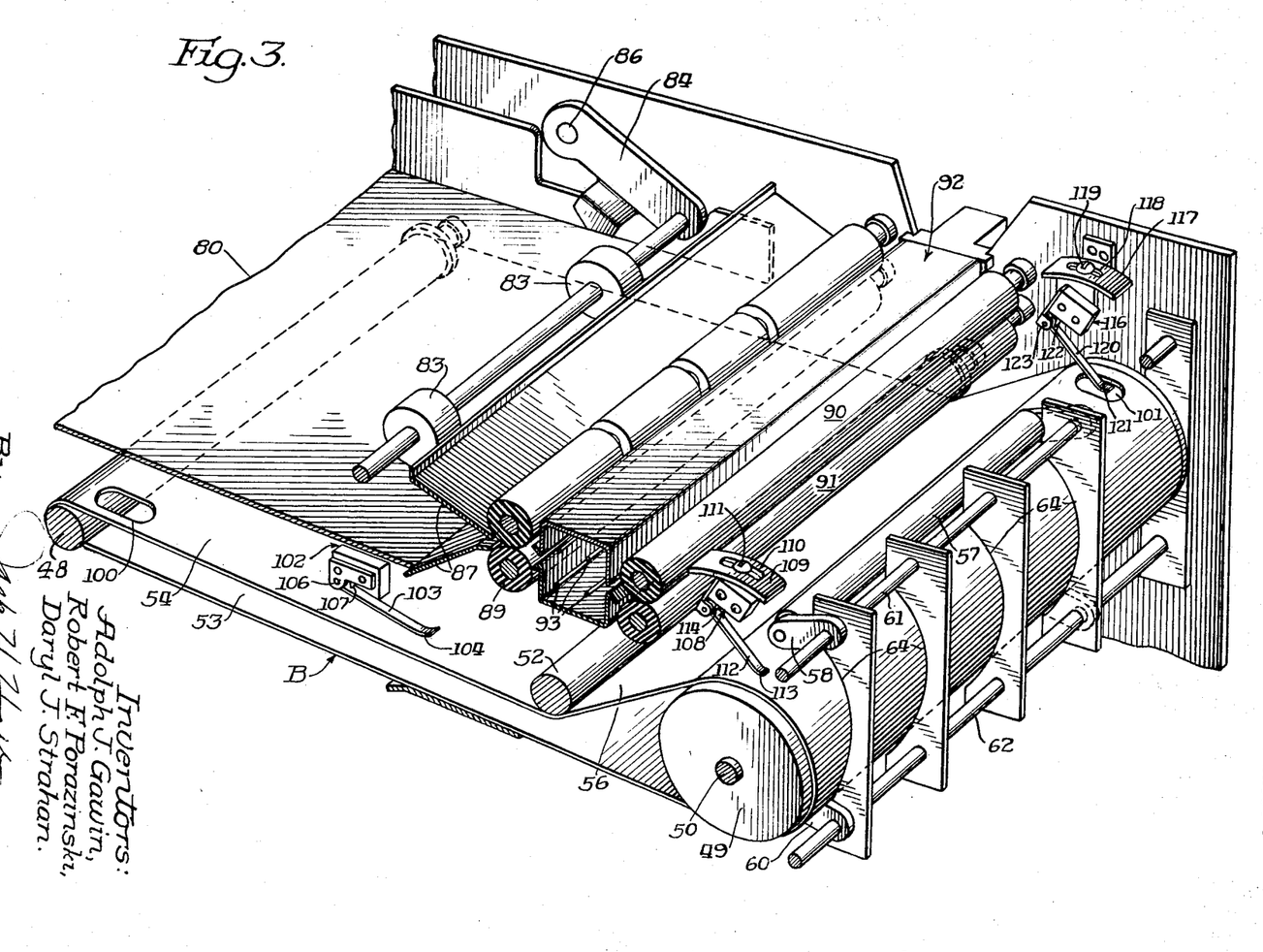
FIG. 3 is a prospective view illustrating additional details of construction of the print-out means provided in accordance with the principles of the present invention.

An exposure switch 116, shown on FIG. 3 on the opposite side of the belt for engaging the openings 101, initiates the control sequence which stops the belt and turns on the projector lamp 27 for exposure of the carrier sheet. The control sequence also includes energizing a timer B6, and the developer roller clutch as explained hereinafter. Switch 116 is adjustably carried in a bracket 117 having an elongated adjustment slot 118 through which extends a fastener screw 119. The switch 116 has a feeler arm 120 and a sensing foot 121 is shown extending through the opening 101. An actuating button 122 is provided on the switch 116 for engagement with the feeler arm 120 and the arm 120 is pivotally carried by the switch 116 as at 123.

There is also shown a mirror return switch 102 having a feeler 103 with a sensing foot 104. The feeler 103 is arranged to be pivotally mounted as at 106 and actuates an actuating button 107 of the switch 102.

Thus on FIG. 3 there is shown a "home" switch at 108 carried adjustably in a bracket 109 having an elongated slot 110 through which extends a fastening means such as a screw 111 and by means of which the switch 108 may be selectively positioned. A feeler arm 112 has a sensing foot 113 and operates to engage an actuating button 114 on the switch 108.

Figure 4:
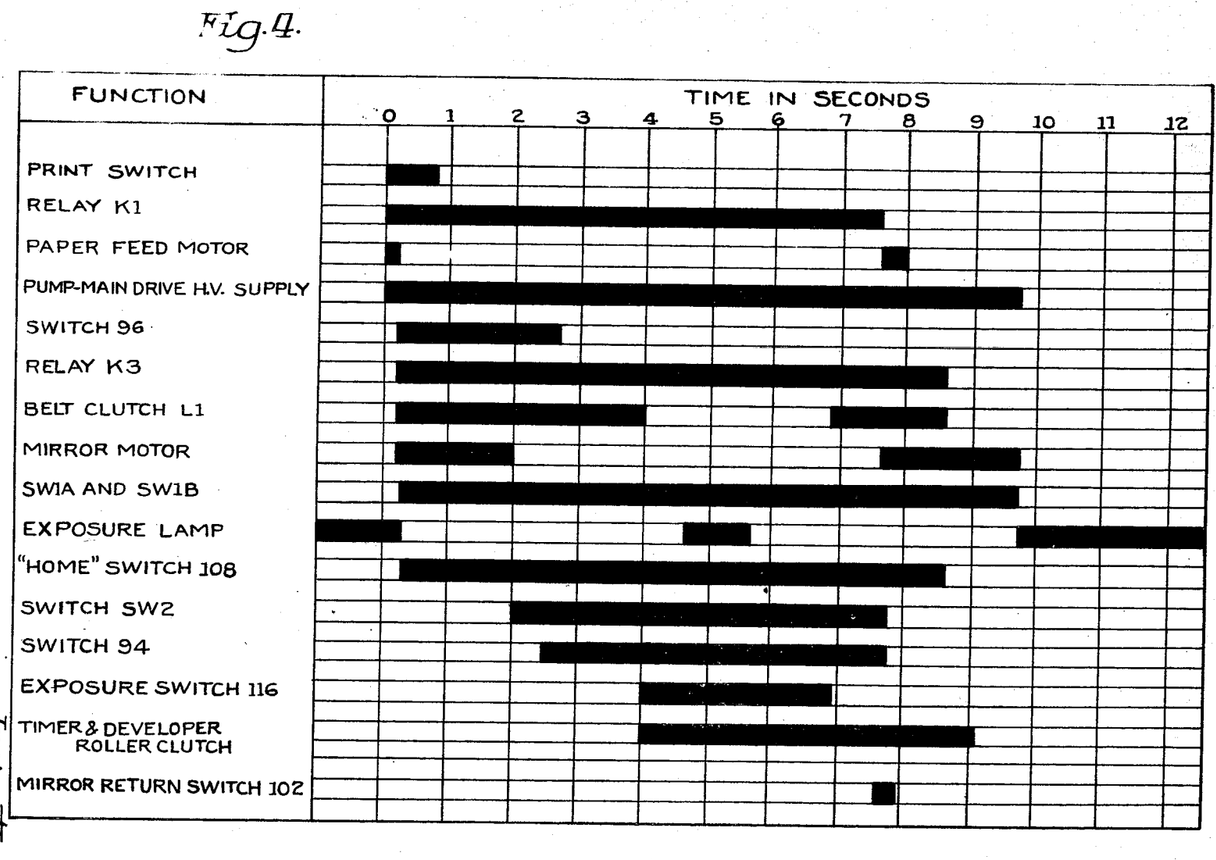
FIG. 4 is a program chart illustrating a program for automatic operation of the reader-printer of FIGS. 1–3.
Figure 5:
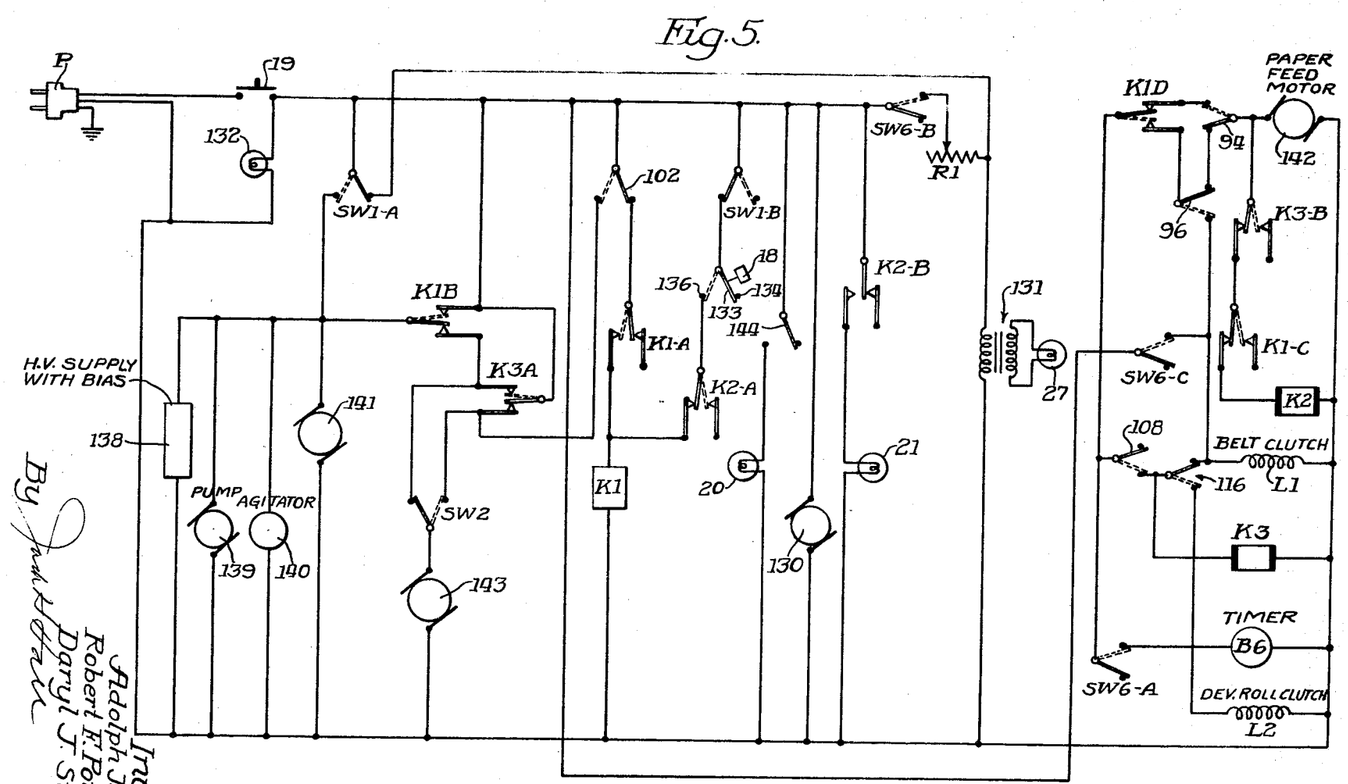
FIG. 5 is a schematic wiring diagram for the electrical circuit of the reader-printer of FIG. 1.

Referring now to FIGS. 4 and 5, the sequence of operation can be described in reference to the various circuitry components regulated by the various switch devices and the belt B.

In FIG. 4 the solid bars illustrating the sequence of operations indicate the period of time in the print cycle during which motors, relays, clutches, lamps, etc. are energized and during which switches, relay contacts, etc. are transferred to the dotted line position in the circuit shown in FIG. 5.

It will be noted in FIG. 5 that the machine is energized through a plug P which may be connected into a socket associated with a usual electrical supply.

The on-off button previously identified at 19, upon actuation, will close the circuit so that a fan motor 130 will be energized, as well as the projection lamp 27. It will be understood that the fan motor 130 drives a cooling fan 135 for drawing a stream of cooling air through the cabinet and removing heat generated by the illumination means. The bulb 27 is energized through a switch SW1–A and a step down transformer indicated generally at 131 on FIG. 5. A "power-on" indicator light 132 will also be energized. Constant voltage is applied to the lamp 27 and therefore constant illumination is directed by the mirror 34 onto the screen 16 for directly viewing images projected through the lens 29.

When the operator desires to make a print of a specific image viewed on the screen 16, he depresses the print button 18. Upon actuation of the print button 18, a switch 133 is moved from a first contact 134 to a second contact 136 so long as the button 18 is depressed. That action operates to energize a relay K1 through a relay contact K2–A. A relay contact K1–A of relay K1 thereupon transfers and locks the relay K1 on through the contacts of the switch 102 shown connected by a solid line.

Energizing relay K1 also causes a second relay contact K1–B to transfer thereby energizing a high voltage supply shown at 138. Further, a pump 139 and an agitator 140, both situated in the reservoir 45 (FIG. 2), but shown specifically in the wiring diagram of FIG. 5, will also be energized. The main driving motor shown at 141 will also be energized. A third relay contact K1–C opens thereby preventing relay K2 from being energized.

Energizing relay K1 also transfers a fourth relay contact K1–D and completes a circuit through the normally closed contacts of switch 96 and the normally open contacts of switch 94, to start the paper feed motor 142 which drives feed rollers 83.

When the paper feed motor 142 moves the top sheet of paper into the first set of transport rollers 88 and 89, thereby engaging the feeler arm 98 of the switch 96 (completing the dotted line circuit), the paper feed motor 142 is deenergized and the belt clutch L1 is also energized, thereby starting the belt B moving in the direction of its length. Transfer of switch 96 to the dotted line position also energized the relay K3 through switch 116.

When the relay K3 operates, the mirror motor 143 is energized through relay contacts K3–A and the normally closed contacts of limit switch SW2. Thus, as the mirror 33 begins to move, the switch SW1–A transfers and deenergizes the primary of the transformer 131, thereby turning off the projection lamp 27.

Further, the switch SW1–B transfers and disables the print switch 133. When the mirror 33 has rotated through an angle of about 40°, it actuates limit switch SW2 which deenergizes the mirror motor 143.

Concurrently, the movement of the belt B actuates the belt home switch shown in FIGS. 3 and 5 at 108 which locks up the belt clutch L1 and the relay K3.

When the charged paper sheet S reaches the exposure station, the coded opening 101 in the belt B is arranged to actuate switch 116 to the dotted line position whereupon the belt clutch L1 will be deenergized to stop the belt. Simultaneously, the timer motor shown at B6 and the developer roller clutch L2 will be energized, thereby allowing the developer roller 72 to rotate.

The timer B6 incorporates three cam switches (FIG. 5), SW6–A, SW6–B and SW6–C, which are actuated according to a predetermined timing sequence described in the following paragraphs.

Cam switch SW6–A is transferred by the timer motor to lock the developer roller clutch L2 and the timer motor B6 on.

Next, the switch SW6–B transfers, whereupon the primary of the transformer 131 will be energized through R1, re-energizing the projection lamp 27 for a predetermined exposure period. The resistance R1 controls the voltage to the primary of the transformer 131 and thus controls the intensity of the illumination provided for exposing the photo-conductive sensitized surface of the sheet S.

When switch SW6–B retransfers, the projection lamp 27 will again be deenergized.

Switch SW6–C then transfers and will energize the belt clutch L1, which starts the belt B and sheet S moving again. Switch SW6–C may be adjusted so that the developer roller clutch L2 is deenergized just as the tail end of the sheet S passes the developer roller 72. Operation of the belt restores switch 116 to its original condition and will lock the belt clutch on.

Next, when the hole 100 of the belt B passes the switch contact 104 of switch 102, switch 102 will transfer to energize the mirror motor 143 through the normallly open contact (dotted line) of switch SW2 and deenergize the relay K1. When the relay K1 drops out, the paper feed motor 142 will be energized through contacts K1–D and the normally closed contacts of switch SW3 causing the carrier sheet from the top of the stack A to be driven to a "pre-feed" position at which the switch 94 will be actuated and transferred to the full line position in FIG. 5 shutting off the paper feed motor. The relay K2 is prevented from being energized because the contacts K3–B remain open.

Next, the belt B returns to its home position and will thereupon retransfer the home switch 108, thereby deenergizing the belt clutch L1 and stopping the belt and also deenergizing the relay K3. However, after relay K3 is deenergized, and relay contacts K3–B return to the normal full line position, if no paper was fed from the tray 81 during the "pre-feed" operation initiated when relay contacts K1–D returned to normal condition, as previously described, switch 94 will remain in transferred condition (indicated by the dotted line connection) and relay K2 will be energized through relay contacts K3–B and relay contacts K1–C. Energization of relay K2 causes transfer of relay contacts K2–B and energizes indicator light 21 to signal the operator that the tray 81 is empty or the paper feed mechanism is malfunctioning.

Also, when relay K2 is energized, relay contacts K2–A are transferred, thereby opening the print button circuit. Hence, switch 94 provides an interlock effective to prevent a print cycle from being initiated in the event the paper supply 80 is exhausted.

Should the level of the liquid developer material go below a predetermined level, a float (not shown) in the reservoir 45 will effect the transfer of a switch 144 thereby energizing the toner indicator light 20 to signal the operator to replenish liquid developer material to normal volume and concentration levels.

Before the trailing edge of the sheet passes over the developer roller 72 in the developer unit 46, the timer reaches the home position as determined by the setting of cam switch SW6–C previously described and will retransfer the switch SW6–A which has the effect of deenergizing the timer motor B6 and deenergizing the developer roller clutch L2, thereby stopping the developer roller from turning and thereby prevent liquid from being splashed onto the back side of the carrier sheet.

The high voltage supply, pump 139, agitator 140 and main drive motor 141 continue to be energized through the switch SW1–A and its normally closed contacts, and the mirror motor 143 through the switch SL1–A and the contacts K1–B and the normally closed contacts of switch SW2. When the mirror 33 reaches the full line position of FIG. 2, switch SW1–A retransfers, thereby deenergizing all the print-out components, stopping the sheet S at the last set of rollers, 77, 78 and turning on the projection lamp 27. Switch SW1–B retransfers at the same time to enable the next print cycle to be initiated.

Although minor modifications might be suggested by those versed in the art, it should be understood that we wish to embody within the scope of the patent warranted herein all such modifications as reasonably and properly come within the scope of our contribution to the art.

We claim:

1. In a copying apparatus, a pair of spaced rollers,
   an endless belt made of electrically insulative material and capable of being electrostatically charged,
      said belt being trained over said rollers to provide a run forming a flat focal plane defining an exposure zone,
      means to feed a carrier sheet onto said belt,
      means including electrostatic charging means adjacent said belt to tack said carrier sheet onto said belt electrostatically,
      means for projecting an image onto said focal plane and means on said belt for controlling the movement of said belt comprising one or more openings in said belt corresponding to timing information.

2. In the copying apparatus as defined in claim 1, wherein said openings define sections of a print-out program, further characterized by contacts sensing said openings, and wherein said control means comprises circuit means responsive to the sensing of said contacts including means to automatically operate the print-out means through successive exposure and developing sections of a preselected program.

3. In the copying apparatus as defined in claim 1, including drive means for said belt including regulating means having sensors responsive to the openings in said belt with the carrier sheet aligned in said exposure zone.

4. In the copying apparatus defined in claim 1, further characterized by developing means adjacent to said exposure zone to which the carrier sheet is delivered, said developing means including means actuated by said control means.

5. In the copying apparatus as defined in claim 4, the further provision wherein one of said rollers is constructed to be of relatively small diameter and is positioned closely adjacent said developing station so that abrupt change of direction of said belt around said smaller diameter roller assists in stripping the carrier sheet from the belt for introduction into the developing station.

6. In the copying apparatus of claim 1, further comprising exposure means including timing means actuated by said control means.

7. A reader-printer comprising:
a cabinet,
a viewing screen in a front wall of said cabinet,
means for projecting an image on said screen, and
a print-out means in said cabinet comprising,
- an endless belt made of a polyester plastic material and constituting a good electrical insulator,
- drive means for moving said belt in the direction of its length,
- means for applying a pre-charged carrier member having a photoconductive image surface on said belt,
- a hold-down corona charging device adjacent said belt to form a charging field through which the belt and said carrier sheet jointly pass, thereby to place the same in electrostatic assembly with one another,
- and means to selectively temporarily stop said belt at an exposure station with said photoconductive surface in optical alignment with the projected image for full frame exposure of the photoconductive surface and without any other supporting means to retain the same at the focal plane of the projected image.

8. In copying apparatus,
a transport belt provided with a plurality of openings defining sections of a print-out program,
contacts sensing said openings,
a support surface on said belt coextensive in size with a carrier sheet to be imaged in the copying apparatus,
- said belt being made of an insulative material capable of retaining an electrostatic charge,
- charging means spaced adjacent said belt and establishing a charging field extending across the entire width dimension of said support surface and through which said belt together with a carrier sheet is moved, thereby to electrostatically connect and hold the carrier sheet in assembly with said support surface,
- means forming an optical track having means for projecting an image onto a focal plane coincident with an exposure station into and out of which said support surface can be selectively moved,
- and circuit means responsive to the sensing of said contacts and including motor drive means to selectively move said belt,
illumination means to project said image, and
developing means to develop the carrier sheet,
- said circuit means activating a program section corresponding to the program sensed, whereby a carrier sheet is loaded on said belt and said belt together with said carrier sheet is successively charged, exposed and developed.

9. For use in copying apparatus,
control and transport means made of insulating plastic material disposed in an endless loop,
- and including a lower leg extending through the focal plane of an optical track,
support and drive means for said belt including a small diameter roller at one end of said lower leg and a large diameter roller at the opposite end thereof,
an idler roller above an upper leg of said belt thereby to dispose said upper leg with a first portion substantially parallel to said lower leg and spaced therefrom approximately the diametral extent of said small diameter roller and a second portion extending upwardly and angularly around said large diameter roller,
a directionalizing guide adjacent said large diameter roller and having transport rollers forming a nip with said belt at the respective upper and lower portions of said large diameter roller,
and a hold-down charge means for establishing a charging field adjacent said belt at the lower portion of said large diameter roller,
and means for feeding a sheet member into the nip formed at the upper portion of said large diameter roller,
whereupon the sheet member and the belt moving through the charging field will be electrostatically interconnected for positioning the sheet member in said focal plane without the assistance of further retention means.

10. In a reader-printer,
a cabinet,
means in said cabinet forming an optical track and including a viewing screen in one wall of said cabinet for viewing a projected image,
and a print-out mechanism in said cabinet including an endless belt having one leg disposed in angular relationship to said viewing screen,
a mirror selectively movable between a first position in said optical track and a second position whereby an image is selectively projected onto a first focal plane at said screen or onto a second focal plane at said leg,
carrier storage means for storing a supply of carrier sheet material having a photoconductive surface on one face of each respective sheet,
a first charging means establishing a first charging field through which said sheet material may be directed for uniformly charging said photoconductive surface,
means for driving said belt in the direction of its length and for feeding the sheet material through the first charging field onto the surface of the belt.
a second charging means establishing a second charging field adjacent said belt and through which said belt and said sheet material may be simultaneously directed for insuring electrostatic interconnection therebetween,
whereby said sheet material is held in place at said second focal plane without any other retaining means for exposure of the photoconductive surface to the projected image,
means for moving said mirror between said first and second positions,
and means on said belt for controlling said moving means,
whereby said mirror is moved at a predetermined time in a print cycle from one of said positions to the other.

11. In the reader-printer of claim 10, further comprising developer means through which the exposed sheet material is directed to develop and render visible the latest electrostatic image formed on said photoconductive surface upon exposure.

12. In the reader-printer of claim 11, second means on said belt for controlling the movement of said belt, said developer means including means actuated by said second control means.

13. In a reader-printer as defined in claim 10 and further characterized by viewing screen being disposed in said front wall of said cabinet and said one leg of said belt extending substantially across the top of said cabinet and said pivoted mirror being arranged to pivot between a substantially vertical position wherein the image is projected onto the second focal plane at said leg and a position inclined at approximately 40° from said vertical position whereupon the image will be projected onto said first focal plate at said screen.

14. A reader-printer comprising a cabinet having a viewing screen in a front wall, print-out means comprising:
a pair of spaced rollers in the top of said cabinet relatively located at the front and rear thereof, respectively,
an endless belt made of insulative material trained over said rollers and providing a horizontally disposed run on the lower leg thereof forming an exposure station,
storage means for feeding a carrier sheet onto the upper run of the belt, charging means adjacent the rear portion of said belt to electrostatically connect the carrier sheet onto the belt as the sheet and belt move together through an electrostatic field produced by the charging means, thereby to hold the sheet stationarily in the exposure zone solely by electrostatic hold-down, and developing means adjacent the front end of said belt for developing the exposed carrier sheet.

15. A reader-printer as defined in claim 14 and further characterized by the provision of means forming an optical track in said cabinet for selectively projecting an image onto said screen or onto said focal plane coincident with said belt at said exposure station.

16. The method of reader print-out which includes the steps of:
(a) driving a belt made of an electrically insulative material through an endless loop having one leg disposed in a focal plane of an optical track,
(b) placing a carrier sheet having a photoconductive surface on said belt,
(c) charging said belt and said carrier sheet electrostatically to couple said belt and said carrier sheet in electrostatic assembly with one another,
(d) controlling the movement of said belt electrically in response to coded openings formed therein,
(e) selectively stopping said belt in response to said coded openings with said carrier sheet in said focal plane, to expose the photoconductive surface on said carrier sheet,
(f) stripping said carrier sheet from said belt, and
(g) thereafter developing said photoconductive surface.

References Cited

UNITED STATES PATENTS

| | | | |
|---|---|---|---|
| 2,979,026 | 4/1961 | Reuter | 355—5 |
| 3,309,960 | 3/1967 | Delplanque | 355—3 |

NORTON ANSHER, Primary Examiner

R. A. WINTERCORN, Assistant Examiner

U.S. Cl. X.R.

353—77; 355—5, 16